United States Patent [19]

Harnden

[11] Patent Number: 5,096,941

[45] Date of Patent: Mar. 17, 1992

[54] ENVIRONMENTALLY DEGRADABLE POLYETHYLENE COMPOSITION

[75] Inventor: Robert M. Harnden, Granville, Ohio

[73] Assignee: The Dow Chemical Company, Midland, Mich.

[21] Appl. No.: 571,965

[22] Filed: Aug. 23, 1990

[51] Int. Cl.$^5$ .......................... C08K 5/56; C08K 5/09
[52] U.S. Cl. .................................. 523/126; 524/398; 524/586
[58] Field of Search ................. 523/124, 126; 524/398

[56] References Cited

U.S. PATENT DOCUMENTS

| | | | |
|---|---|---|---|
| 3,830,764 | 8/1974 | Hudgin et al. | 523/126 |
| 3,935,141 | 1/1976 | Potts | 524/398 |
| 3,994,855 | 11/1976 | Boberg . | |
| 4,025,580 | 5/1977 | Taylor . | |
| 4,067,836 | 1/1978 | Potts et al. . | |
| 4,121,025 | 10/1978 | Scott | 523/126 |
| 4,461,853 | 7/1984 | Gilead et al. . | |
| 4,714,741 | 12/1987 | Balduff et al. . | |

FOREIGN PATENT DOCUMENTS 88032A of 0000 Romania .

OTHER PUBLICATIONS

Chemical Abstract CA80(10):48643r.
Chemical Abstract CA88(24):170694p.
Chemical Abstract CA103(2):7188w.
Chemical Abstract CA111(17):152489q.
Papahagi, et al., "The Oxidation of n-Dodecane In Liquid Phase With Molecular Oxygen In The Presence of Aluminum, Lanthanum and Cerium Naphthenates," Roumaine de chimie, 26, 9-10, pp. 1279-1283 (1981).
Wilder, "Degradability I: 'Disappearing' package: pipe dream or savior?", Modern Plastics International, vol. 19, No. 9, pp. 81-85, Sep. 1989.
Klemchuk, "Degradability II: Chemistry of plastics casts a negative vote," Modern Plastics International, vol. 19, No. 9, pp. 82-85, Sep. 1989.
Ballinger, "Photodegradation: Effect of Cerium Derivatives In Polymers," Rhone-Poulenc, Nov. 2-4, 1989.
Schwab, "Effects Of Photodegradants On The Biodegradability Of Polymers," Mobile Chemical Company, R&D.

Primary Examiner—Joseph L. Schofer
Assistant Examiner—Mark Sweet

[57] ABSTRACT

A polymeric composition which degrades in the presence of oxygen either photochemically or thermooxidatively comprising a blend of polyethylene, e.g. low density polyethylene and cerium (III) stearate.

This composition is especially useful in degradable food wrap and packaging and as an agricultural mulch film.

14 Claims, 15 Drawing Sheets

ENVIRONMENTALLY DEGRADABLE POLYETHYLENE COMPOSITION

BACKGROUND OF THE INVENTION

The present invention relates to environmentally degradable polyolefin compositions and to environmentally degradable articles, films, and foams made from such compositions.

Thermoplastic synthetic resins are widely employed in the manufacture of diverse solid and foamed articles of commerce. Among the more well known plastic materials are polyethylene, polypropylene and polystyrene, all of which have been used in solid and foamed articles such as food packaging, films, bags, cups, cartons, trays and the like. Agriculture and construction trades are among the largest users of plastic materials, with applications such as agricultural mulching films, construction films, insulation, bags for fertilizers and pesticides, cartons and trays.

The huge volume of plastic products used by industry and consumers has raised concern among environmentalists about disposal. Environmentalists are concerned that the chemical inertness and stability of thermoplastic resins may contribute to solid waste disposal problems, because the conventional polymers do not degrade naturally within a reasonable period of time. During natural degradation, a total dissolution of an organic substance such as cellulosic products under the action of sun, heat, wind and rain, as well as fungi and microorganisms in the soil takes place.

However, unlike materials such as paper and cardboard, plastics are not readily destroyed by the elements of nature and are not easily degradable by microorganisms which attack most other forms of organic matter and return them to the biological life cycle. It has been estimated that it may take millions of years for organisms to evolve which are capable of performing this function.

The use of plastic materials in agriculture applications has a varying impact on the ecology and the economy. Produce is packaged in plastic crates, tote boxes and trays. Fertilizers and chemicals are brought to the farm in plastic packaging materials such as shipping bags or plastic containers. Plastic bailing twine and plastic irrigation tubing are used. A very important application for plastic is in agricultural films. These films make it possible to grow crops in areas where the climate is a limiting factor. In locations where the same crops have been grown traditionally, a marked increase in the quantity and quality of crops grown with the use of agricultural films can be obtained. Moreover, in many cases a reduction in fertilizers, pesticides and herbicides is made possible which represents not only a great savings in cost, but also reduces the damage caused by these chemicals to the environment. However, recovery of the films, which are spread over large areas, presents an arduous and costly task. Recovery must be effected, lest further cultivation of the land becomes practically impossible.

Various approaches to produce environmentally degradable polymer compositions for use in the fabrication of containers, films, bags and the like have been essayed. One approach provides for the incorporation of photosensitive additives to a host polymer to impart environmental degradability to the articles, particularly by photodegradation mechanisms. The use of such additive systems has caused substantial problems in the past. For example, the polymer photosensitive additive systems have exhibited a spontaneous separation of the components or component migration to the surface of the article during and after melt extrusion. The additive systems are often subject to discoloration and odor generation during processing of the melt, requiring the addition of dye colorants to maintain an acceptable product appearance. Such systems have had poor extrusion viscosity characteristics and poor thermoformability and have not exhibited the requisite stiffness or flexibility for certain applications.

Another approach involves the blending of high density polyethylene or medium density polyethylene with an ethylene-carbon monoxide copolymer, such as disclosed in German patent document No. 2316697 entitled "Polymeric Substance Photo-decomposable by the Action of Ultraviolet Irradiation". However, such blends degrade too rapidly for successful use in articles requiring flexibility.

Cerium octoate has been said to enhance the degradability of ethylene polymers in the presence of ultraviolet light or ionizing radiation, that is, when the polyethylene composition is irradiated after use and prior to disposal. However, such radiation is not always present, and it would be desirable to have polyolefins that are degradable under other circumstances as well.

There continues to exist a need for environmentally degradable polymeric compositions which have sufficient mechanical properties for end use applications such as food packaging, agriculture and construction films and foams such as food wrapping, agricultural mulch film, beverage loop carriers and grocery sacks, and which exhibit balanced environmental degradation, excellent mechanical properties, extrudability, thermoformability, and do not spontaneously suffer component migration or separation upon melt extrusion formation or during use.

SUMMARY OF THE INVENTION

In the present invention it has been surprisingly discovered that polyethylene compositions containing cerium (+3) stearate are not only photodegradable, but also thermally degradable. More particularly, it has been surprisingly discovered that the incorporation of cerium (+3) stearate into polyethylene compositions is effective to promote the environmental degradation of the polyethylene composition both thermally and oxidatively (in the presence of oxygen but the absence of ultraviolet or visible radiation) and photo-oxidatively (in the presence of both oxygen and ultraviolet radiation) to low molecular weight oxygenated products, such as ketones, carboxylic acids, alcohols, esters and aldehydes.

PREFERRED EMBODIMENT OF THE INVENTION

Figure 1:
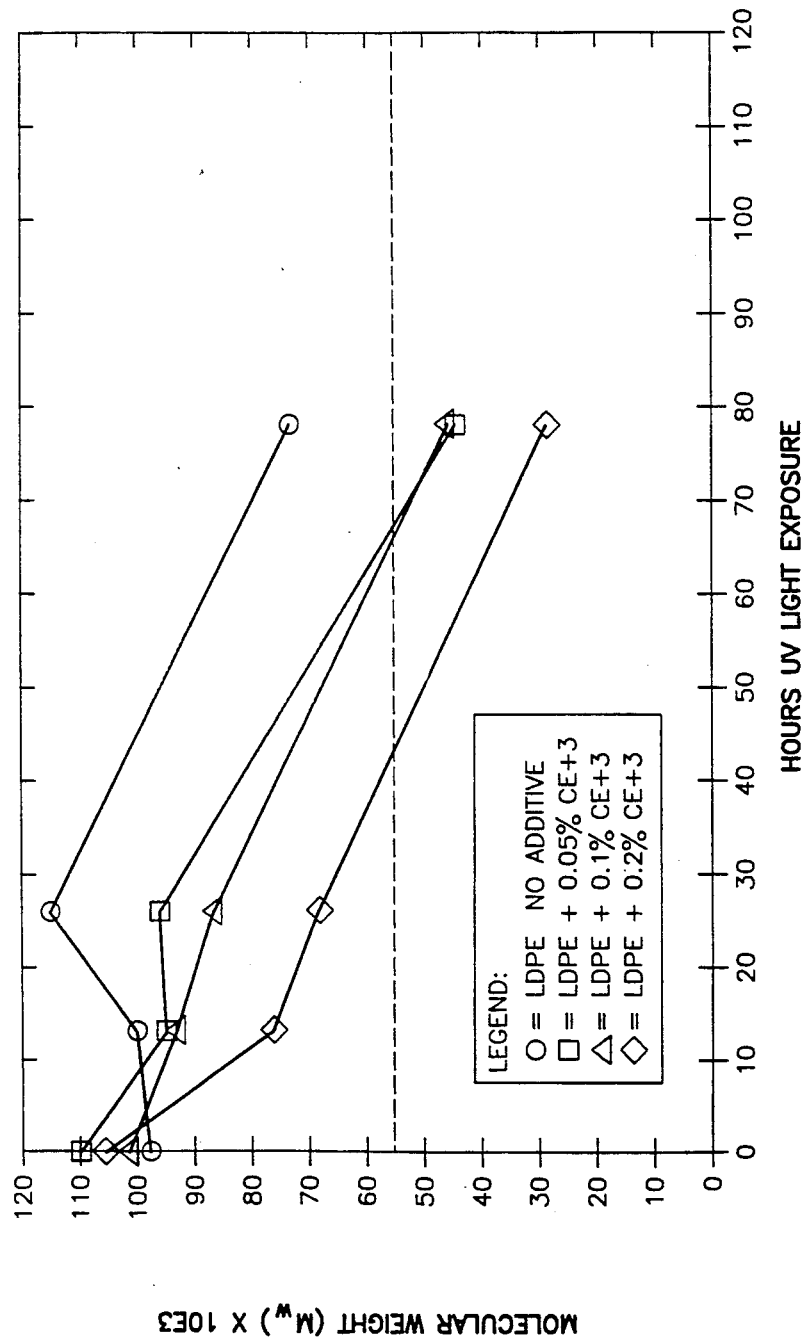
FIG. 1 demonstrates effect of cerium +3 stearate on the ultraviolet light dependability of polyethylene.
Figure 2:
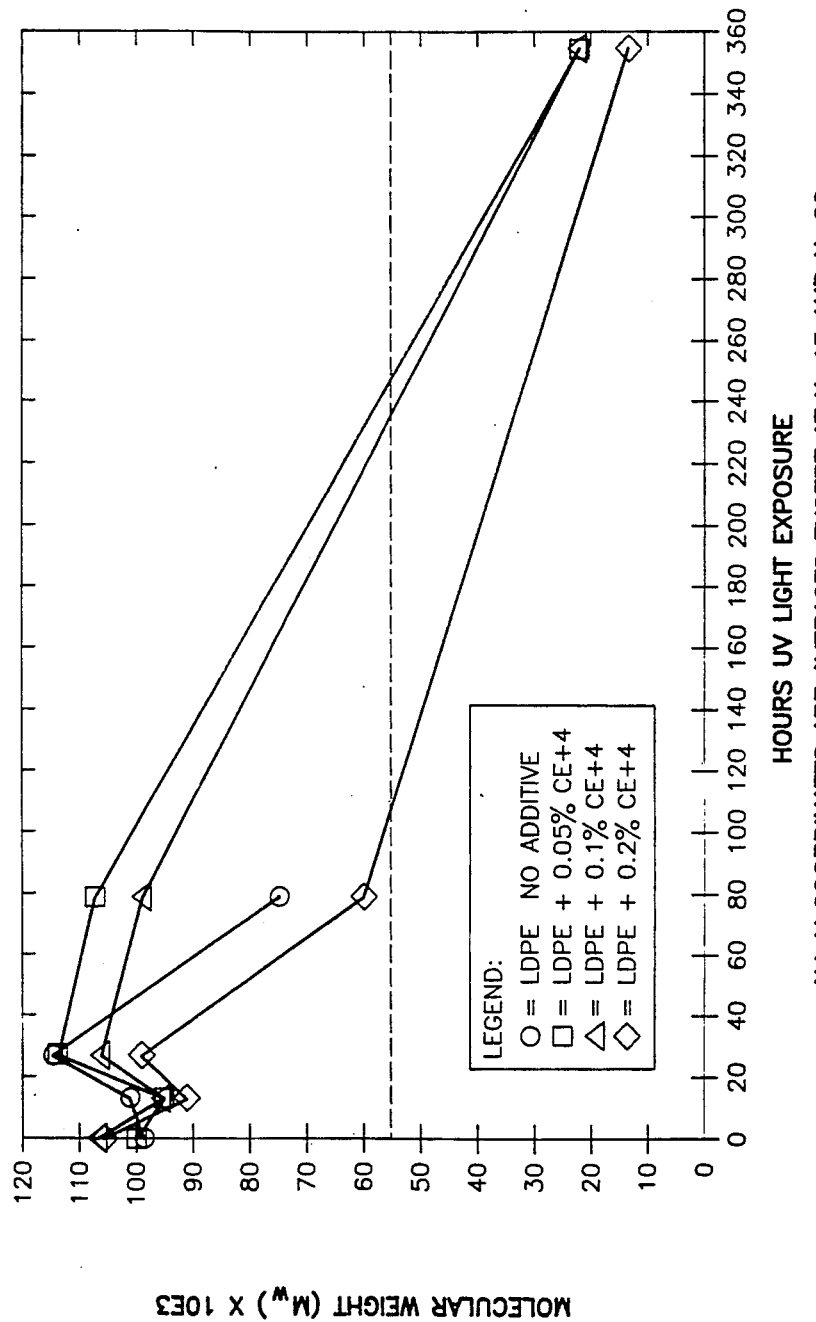
FIG. 2 demonstrates effect of cerium +4 stearate on the ultraviolet light degradability of polyethylene.

In accordance with the preferred embodiment of the present invention, there is provided a polymer composition comprising polyethylene and cerium +3 stearate, which degrades and then embrittles to oxidized, low molecular weight products upon exposure to air and ultraviolet radiation (313 nm peak wavelength) or darkness; or upon exposure to heat and air. Elevated temperatures (40°-70° C.) increases the rate of degradation. Shelf life (molecular weight loss of less than 10 percent) at room temperature is at least six months but less than one year. The unique feature of the composition is the capability to degrade both photochemically and/or thermo-oxidatively. In other words, ultraviolet light radiation is not necessary for degradation to occur, as is the case with other degradable polymer compositions. Oxygen is the only prerequisite.

Another feature of the invention is that it may be used for food packaging, as cerium +3 stearate has been shown to be of low toxicity. An added advantage of cerium stearate is that it also serves as a processing aid in polymer extrusion. Thus, the invention provides polyethylene compositions which are suitable for use in the preparation of degradable packaging, agricultural and construction films and foams which would otherwise result in unsightly litter or in landfill disposal. Specific applications include polyethylene food wrap, agricultural mulch film, beverage loop carriers and grocery sacks.

Substantially any normally solid thermoplastic ethylene polymer can be employed in the practice of the invention. The polymer may be an ethylene homopolymer or copolymer wherein the ethylene fraction is predominant. Both high and low density polyethylenes and mixtures thereof can be used.

The high density ethylene polymer which is useful in the present invention are essentially linear in structure, and are known as "linear polyethylenes". It is known that high density linear polyethylenes can contain chain transfer agents, and/or chain terminating agents which are used to modify the melt viscosity, molecular weight or other properties of the resins and it is intended to encompass such modified polymers within the scope of this invention. The high density polyethylenes are generally characterized by density that is equal to or greater than 0.94 grams per centimeter, and is usually in the range from about 0.94 to about 0.97 grams per centimeter. The high density polyethylenes can have a melt index of from 0.005 to 100, and preferably from 0.15 to 50 decigrams per minute (ASTM D-1238). Mixtures of high density polyethylenes can be used, and such mixtures can have a melt index less than 0.005 or greater than 100 decigrams per minute.

The low density ethylene homopolymers and copolymers have densities of less than 0.94 grams per centimeter and are usually in the range from about 0.91 to about 0.93 grams per centimeter. The low density ethylene homopolymer have melt indexes from about 0.05 to about 100 decigrams per minute inclusive, and preferably from 0.5 to 20 decigrams per minute, with mixtures thereof being used if desired.

The ethylene copolymers useful in the practice of this invention are those obtained by the polymerization of ethylene with any monomer containing at least one olefinically unsaturated group which will copolymerize with ethylene and form thermoplastic copolymers. Illustrative of such copolymerizable monomers are the alpha olefins (in minor amounts) containing up to eighteen carbon atoms such as propylene, 1-butene, isobutene, 1-pentene, octene and hexene; halogenated olefins such as chloroprene, tetrafluoroethylene, chlorotrifluoroethylene, hexafluoropropylene; vinylaryls such as styrene, o-methoxystyrene, p-methoxystyrene, m-methoxystyrene, o-nitrostyrene, p-nitrostyrene, o-methylstyrene, p-methylstyrene, m-methylstyrene, p-phenylstyrene, o-phenylstyrene, m-phenylstyrene, vinylnaphthalene, and the like; vinyl and vinylidene halides, such as vinylchloride, vinylfluoride, vinylidene chloride, vinylidene fluoride, vinylidene bromide and the like; vinyl esters such as vinyl formate, vinyl acetate, vinyl propionate, vinyl butylate, vinylchloroacetate, vinylchloropropionate, vinylbenzoid, vinylchlorobenzoid and the like; acrylic and alpha-alkyl acrylic acids, their alkyl esters, their amides and their nitriles such as acrylic acid, chloroacrylic acid, methacrylic acid, ethacrylic acid, methylacrylate, ethylacrylate, butylacrylate, n-octylacrylate, 2-ethylhexylacrylate, n-decylacrylate, methylmethacrylate, butylmethacrylate, methylethacrylate, ethylethacrylate, acrylamide, n-methylacrylamide, N,N-dimethylacrylamide, methacrylamide, N-methylmethacrylamide, N,N-dimethylmethacrylamide, N-methylmethacrylamide, N,N-dimethylmethacrylamide, acrylonitrile, chloroacrylonitrile, methacrylonitrile, ethacrylonitrile and the like; maleic and fumaric acid and their anhydrides and alkyl esters such as maleic anhydride, dimethyl maleate, diethyl maleate and the like; vinylalkyl esters and ketones such as vinylmethylether, vinylethylether, vinylisobutylether, 2-chloroethylvinylether, methylvinylketone, ethylvinylketone, isobutylvinylketone and butadiene, isoprene, cyclopentadiene, hexadiene-1,6, norbornadiene, dicyclopentadiene and the like; also vinylpyridine, N-vinylcarbazole, N-vinylpyrollidine, acrolein, vinylalcohol, vinylacetal, vinylbutyral and the like. Other monomers which may be interpolymerized with ethylene include carbon monoxide and formaldehyde but these are generally not preferred.

These copolymer resins should contain a major amount of ethylene units polymerized in the copolymer. Preferably the copolymer should contain from about 50 to about 99 weight percent polymerized ethylene monomer and most preferably from about 80 to about 99 weight percent polymerized ethylene monomer, depending upon the particular copolymerizable monomer employed and the intended end use of the ethylene polymer composition of this invention.

Preferred thermoplastic resins are the ethylene homopolymers while the preferred copolymer base resins are ethylene-vinylacetate; ethylene-ethylacrylate and the partially hydrolyzed ionic salt forms thereof; ethylene-acrylic acid, and the ionic salt forms thereof; ethylene propylene and ethylene styrene. The preferred terpolymer is ethylene-propylene-norbornene. The ethylene polymeric material constitutes the major component of the polymer composition and is normally present at a concentration of from about 70 to about 99 percent by weight, the remainder of the composition being the other additives thereof. Preferably the base resin is present at a concentration of from about 90 to about 99 weight percent of the ethylene polymer composition.

The cerium +3 stearate is employed in a range of from about 0.05 to 0.5 weight percent, preferably 0.1 to 0.3 weight percent.

The degradable compositions of this invention are easily prepared by conventional blending techniques, such as by forming a melt of the ethylene polymer, and followed by addition of the cerium +3 stearate to the molten polymer, employing a Brabender mixer or equivalent.

The following examples are illustrative of the invention and should not be so construed as to limit its scope. Unless otherwise indicated, all amounts are in parts by weight.

EXAMPLE 1

Ethylene polymer compositions comprising low density polyethylene (LDPE) (0.92 density) and containing as an environmental degradation enhancer cerium (3) stearate or cerium (4) stearate in amounts of 0% (control), 0.05%, 0.10% and 0.2% of cerium salt as a dry powder were prepared by melt blending in a Brabender mixer. The formulations were as follows:

| Sample No. Ingredients | Control | 1-1 | 1-2 | 1-3 | 1-4 | 1-5 | 1-6 |
|---|---|---|---|---|---|---|---|
| Polyethylene | 100 | 100 | 100 | 100 | 100 | 100 | 100 |
| Ce(3) Stearate, wf % | 0 | 0.05 | 0.10 | 0.2 | — | — | — |
| Ce(4) Stearate, wf % | 0 | — | — | — | 0.05 | 0.1 | 0.2 |
| Cerium salt, g | 0 | 0.02 | 0.04 | 0.08 | 0.02 | 0.04 | 0.08 |
| Cerium metal, ppm | 0 | 74 | 147 | 293 | 55 | 110 | 220 |

The ingredients were melt-blended in a Brabender mixer. The polyethylene was added first and pre-melted/mixed for 1 minute under nitrogen purge. The Ce +3 or +4 stearate powder was then added. Mixing conditions as follows:

Blend Mass—40 g
Temperature—170° C.
Time—10 min for Ce(III) Stearate and LDPE blends
 5 min for Ce(IV) Stearate and LDPE blends
Purging—nitrogen at 4 psi guage
Mixing—50 rpm

PREPARATION OF TEST SAMPLES

The melt blended formulations were hot-pressed into 0.013-0.015 thick plaques using a PHI Platten Press with the following conditions:

Melt Temperature—350 degrees F.
Melt time—6 min.
Press Pressure—35 tons force
Press Time—2.5 min.
Cool Time—2.5 min.
Cool Pressure—35 tons force

ENVIRONMENTAL STRESS TESTING

Ultraviolet Light Exposure:
QUV Chambers manufactured by the Q-Panel company were fitted with UV-B Range (313nm peak wavelength) bulbs for accelerated UV exposure. The following conditions were chosen for stress testing:

UV Exposure Cycle—4 hrs. at 60 degrees C.
Condensation Cycle—4 hrs. at 45 degrees C.
Thermal Exposure:
A fan-forced hot air oven was used at 160 degrees F. for sample thermal stress testing. Sample plaques were layed flat on trays.
Sampling of UV and Thermal Stress Test Samples:
At selected intervals 1 cm$^2$ pieces were cut from the test samples for subsequent analysis by Infrared Spectroscopy, Size Exclusion Chromatography and Differential Scanning Calorimetry.
Sample Analysis:
The samples were monitored for degradation and oxidation by the anytical techniques detailed below.
Molecular Weight Loss:
High temperature Size Exclusion Chromatography was used for determining the loss in molecular weight of the test samples. The following instrumental conditions were employed:

Sample size—8 mg
Chromatograph—Waters 150° C.
Columns—2-3×30 cm, 10 um PL Gel (Polymer Laboratories)
Mobile Phase—1,2,4-Trichlorobenzene (Burdick and Jackson Laboratories) at 1.0 ml/min
Temperatures—135 degrees C.
Detection—Waters R 401 Differential Refractometer
Calibration—Narrow Fraction Polystyrene Standards were analyzed and used for calibration with each batch of 14 samples.

Monitoring of samples for oxidation products, such as ketones, carboxylic acids and aldehydes, was accomplished by Infrared Spectroscopy in the transmission mode. Thin, cross-sectional razor slices were compressed, mounted on a stainless steel disc with a 2 mm aperture and analyzed as follows:

Spectrometer - Perkin-Elmer Model 1750 Fourier Transform Infrared Spectrometer
DTGS detection
4 cm$^{-1}$ Resolution -continued

| Spectrometer - Perkin-Elmer Model 1750 Fourier Transform Infrared Spectrometer |
|---|
| Apodization - medium |
| 32 scans |
| Second Sampling Position |

The other analytical technique utilized for quantitatively determining degree of oxidation was elemental analysis of c, H and O.

DISCUSSION OF RESULTS

The rate and degree of polyethylene molecular weight loss in the sample plaques exposed to both ultraviolet and thermal (160 degrees F.) stresses was monitored at selected intervals by high temperature size exclusion chromatography. The weight-average (Mw) and number-average (Mn) molecular weights are tabulated in Tables 1 and 2 and graphically represented in FIGS. 1-4 for the two different stress tests. Tables 1 and 2 are as follows:

TABLE 1

Thermal Oven (160 degrees F.) Testing
Molecular Weight Analysis

| Formulation | | Molecular Weights × 10e3 Sampling Time (days) | | | |
|---|---|---|---|---|---|
| | | 0 | 6 | 13 | 20 |
| Control | Mw | 99 | 92 | 108 | |
| | Mn | 14 | 16 | 16 | |
| 1-1 | Mw | 103 | 32 | 19 | |
| | Mn | 13 | 8 | 7 | |
| 1-2 | Mw | 99 | 96 | 101 | |
| | Mn | 14 | 17 | 20 | |
| 1-3 | Mw | 98 | 10 | 8 | |
| | Mn | 11 | 4 | 4 | |
| 1-4 | Mw | 99 | 95 | 104 | 105 |
| | Mn | 16 | 17 | 21 | 22 |
| 1-5 | Mw | 97 | 105 | 108 | 103 |
| | Mn | 14 | 17 | 20 | 22 |
| 1-6 | Mw | 98 | 104 | 102 | 110 |
| | Mn | 16 | 19 | 19 | 24 |

TABLE 2

UV (313 nm)/Condensation Testing
Molecular Weight Analysis

| Formulation | | Molecular Weights × 10e3 Sampling Time (hours UV excposure) | | | | | |
|---|---|---|---|---|---|---|---|
| | | 0 | 13 | 26 | 39 | 78 | 262 |
| Control | Mw | 99 | 100 | 115 | 105 | 75 | |
| | Mn | 14 | 20 | 18 | 16 | 13 | |
| 1-1 | Mw | 103 | 94 | 95 | | 44 | |
| | Mn | 12 | 18 | 14 | | 8 | |
| 1-2 | Mw | 99 | 92 | 87 | | 44 | |
| | Mn | 14 | 18 | 14 | | 8 | |
| 1-3 | Mw | 98 | 76 | 68 | 35 | 19 | |
| | Mn | 11 | 14 | 13 | 8 | 6 | |
| 1-4 | Mw | 99 | 95 | 114 | 111 | 106 | 22 |
| | Mn | 16 | 20 | 17 | 17 | 12 | 3 |
| 1-5 | Mw | 96 | 95 | 106 | 100 | 97 | 22 |
| | Mn | 14 | 22 | 15 | 16 | 13 | 5 |
| 1-6 | Mw | 98 | 91 | 98 | 91 | 60 | 13 |
| | Mn | 17 | 21 | 15 | 14 | 9 | 3 |

Referring to the figures, several results are discernible.

Figure 3:
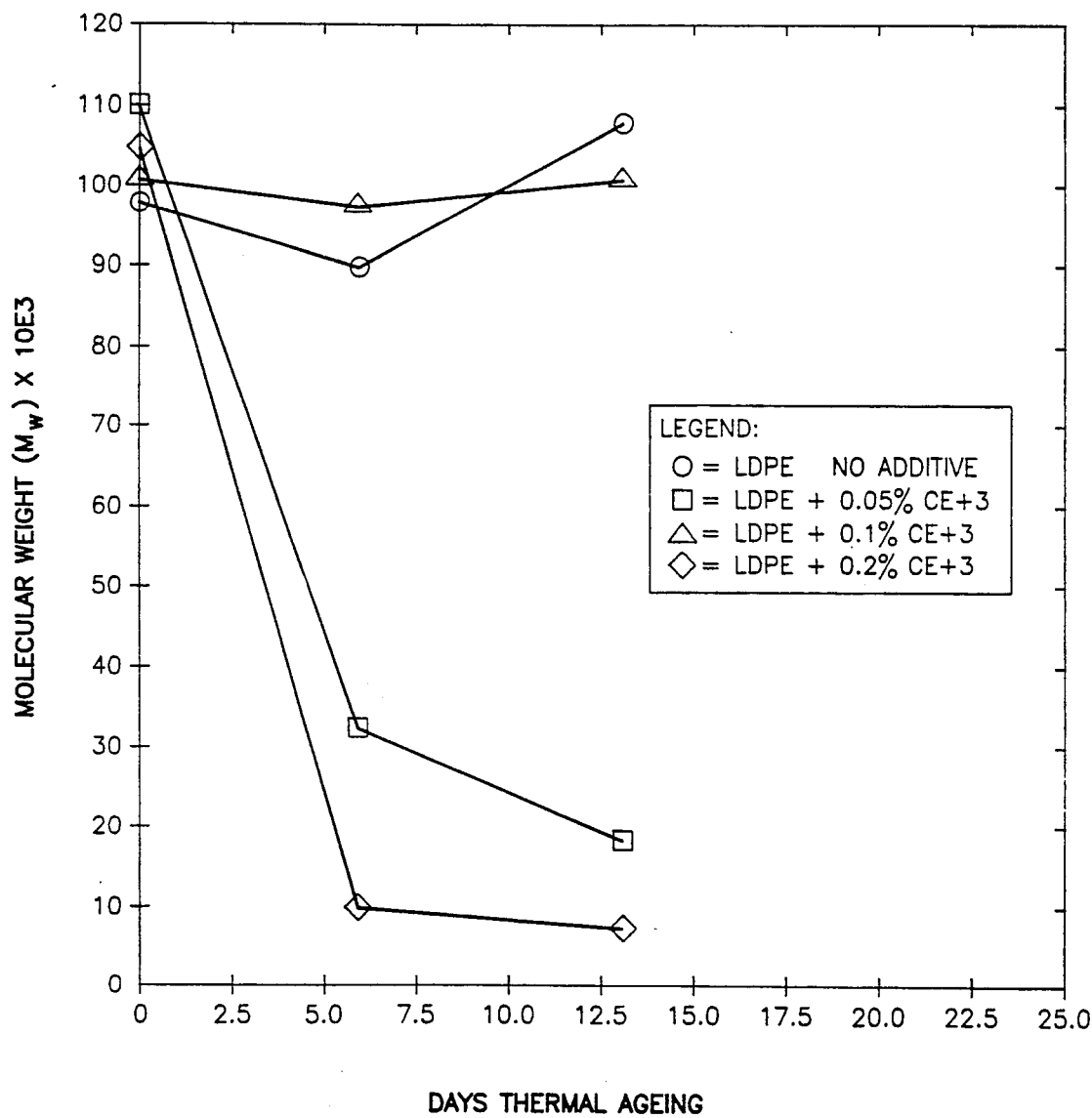
FIG. 3 demonstrates effect of cerium +3 stearate on the thermal degradability of polyethylene.
Figure 4:
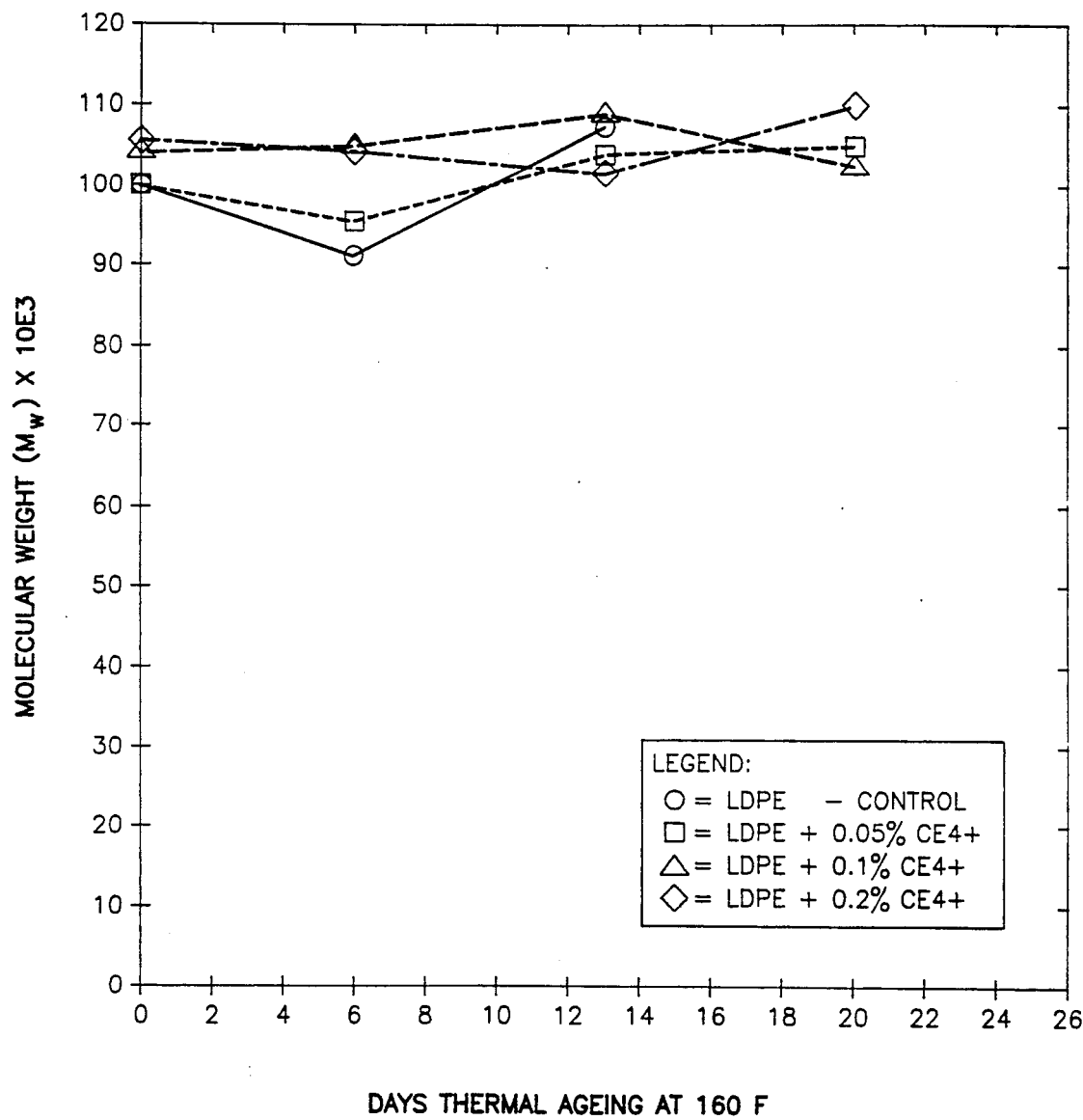
FIG. 4 demonstrates the effect of cerium +4 stearate on thermal degradability of polyethylene.

1) Both Ce 3+ and Ce 4+ stearates promote the degradation of breakdown of low density polyethylene exposed to ultraviolet light, although Ce 3+ is much more active in this regard.
2) Under thermal stress Ce 3+ actively promotes polyethylene degradation as shown in FIG. 3, while Ce4+ stearate is shown to have no noticeable effect on the thermal degradation of LDPE (FIG. 4). This is a very desirable features of a disposable packaging article if exposure to UV radiation is unlikely.
3) A concentration effect is also evident in FIGS. 1, 2 and 3 with rate and degree of molecular weight loss increasing with condensation. An exception to this generalization is seen in the 0.1% Ce 3+/LDPE sample, which shows no difference from the control in thermal testing data (FIG. 3). It is believed that the ce 3+ stearate underwent oxidation in the Brabender mixer, as the material yellowed during mixing, unlike the other samples. It is likely that a significant concentration of oxygen was still present at the time of Ce 3+ stearate addition due to insufficient nitrogen purging.
4) A general trend of increasing molecular weights was observed during the first 30-40 hours of UV aging and first 13 days of thermal aging. This is believed to be a function of problems with molecular weight calibration due to chromatographic column degradation during the course of the study. Precision of the data is ±5%, relative. Although not researched in the present study, thickness likely will affect the rate and degree of degradation of samples exposed to UV stressing. As only one side or surface of the samples is exposed to UV radiation, significant beam attenuation occurs upon penetration into the sample, resulting in a degradation gradient through the sample. Cross-sectional sampling of the test specimens resulted in an "average" degradation degree, as determined by molecular weight analysis. The actual rate of degradation in the QUV* chamber is therefore very dependent upon sample thickness. Another problem associated with the QUV is that the weathering process is accelerated by elevated temperature (60 degrees C.). In the case of Ce3+ test samples, thermooxidative degradation is likely occurring in addition to photo-oxidative. Therefore, the separate effect of UV radiation cannot be assessed from this study.

Figure 5:
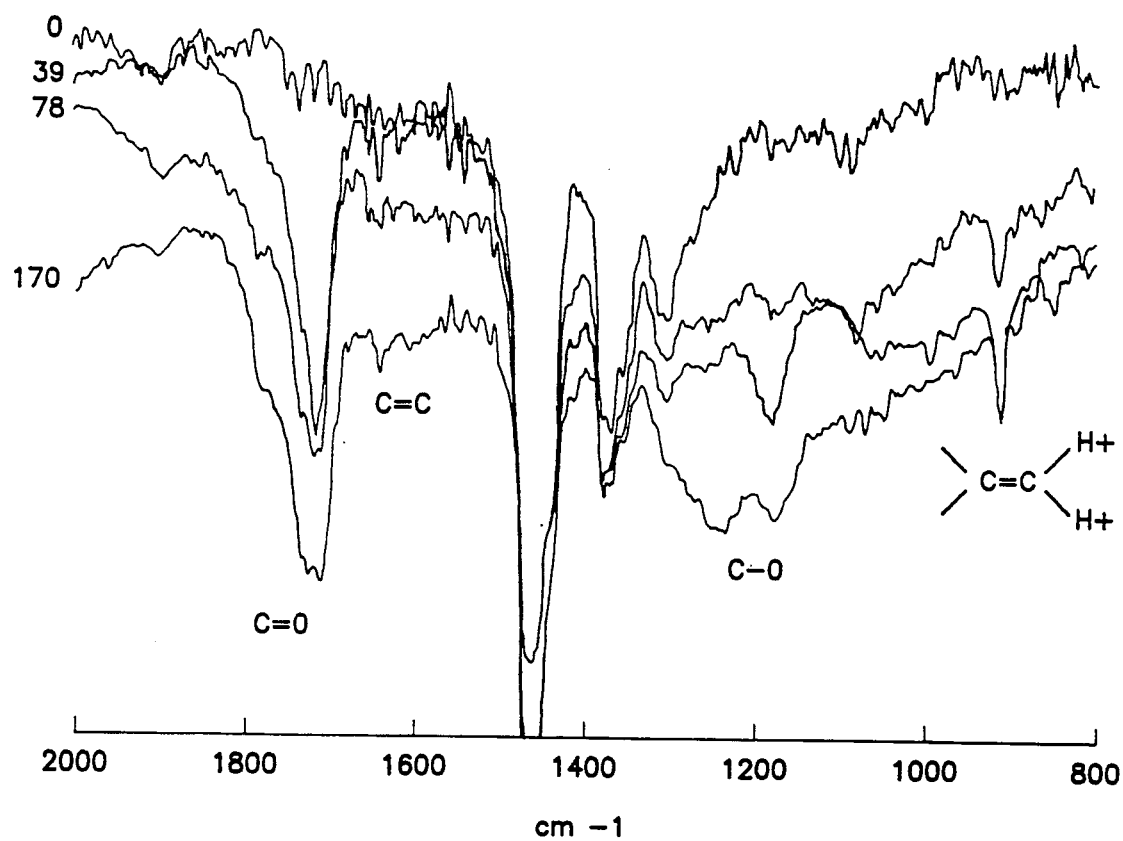
FIG. 5 is an overlayed spectra of polyethylene containing 0.2% cerium +3 stearate exposed to ultraviolet radiation for various time periods.
Figure 6:
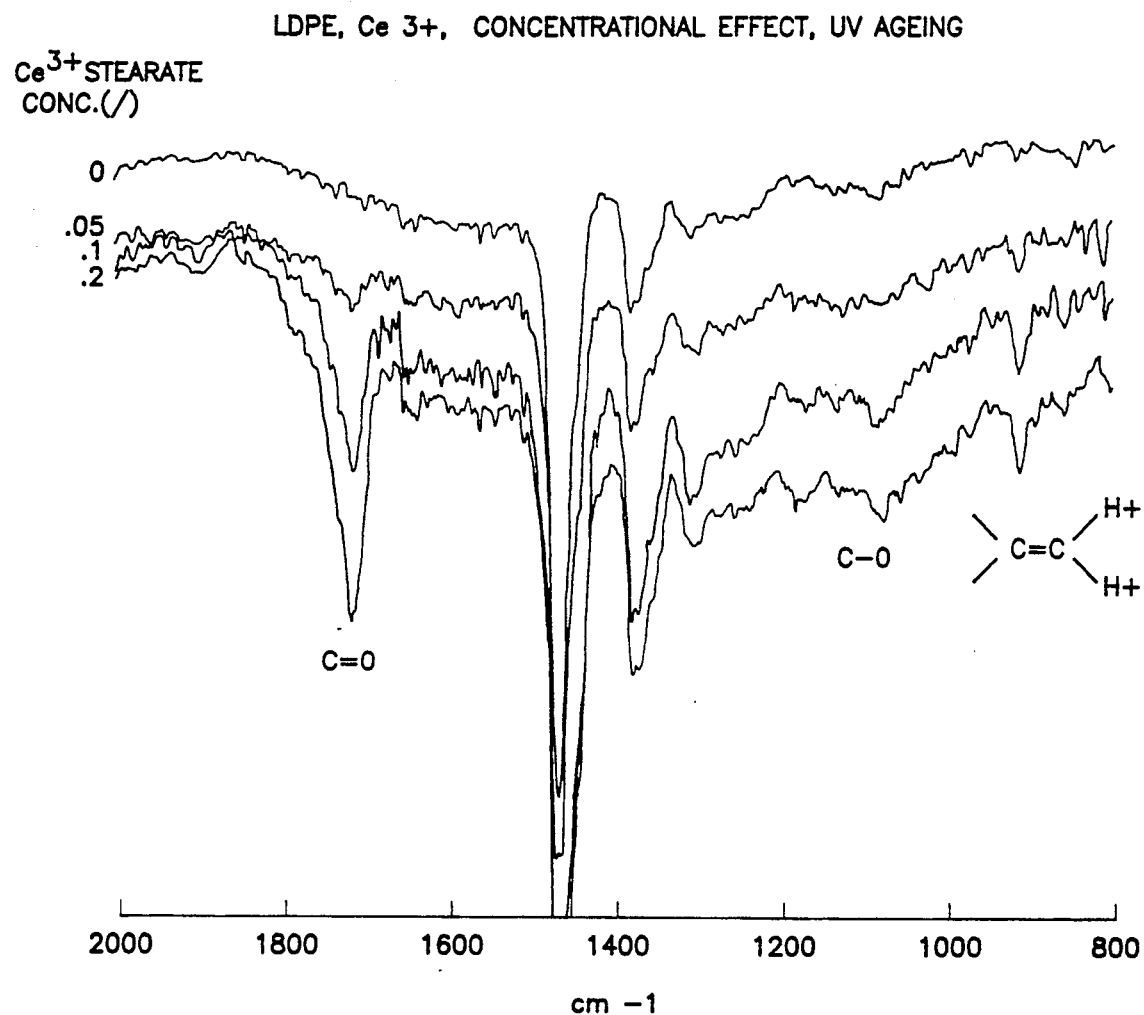
FIG. 6 represents the effect of cerium +3 stearate concentration on the degradation of polyethylene exposed to ultraviolet radiation.
Figure 7:
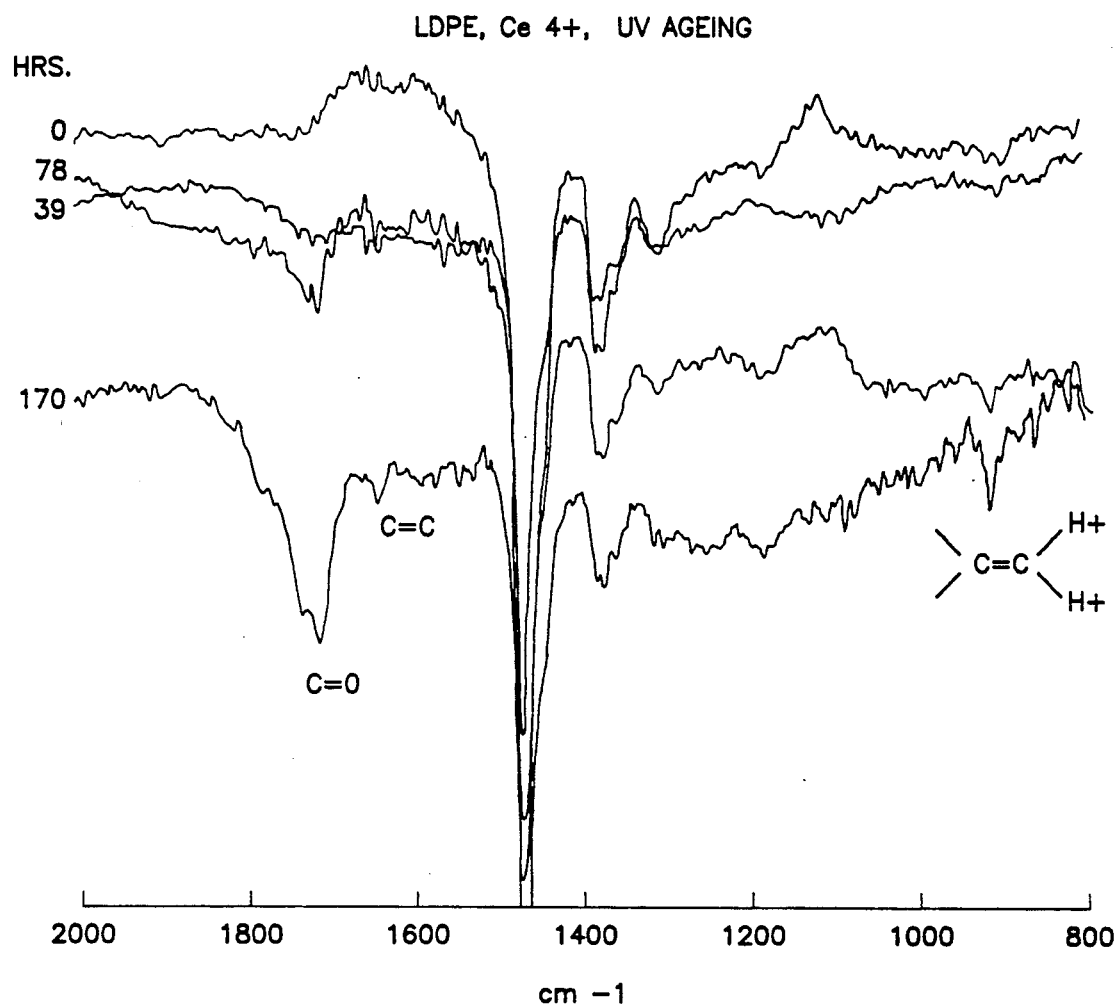
FIG. 7 is an overlayed spectra of polyethylene containing 0.2% cerium +4 stearate exposed to ultraviolet radiation for various time periods.
Figure 8:
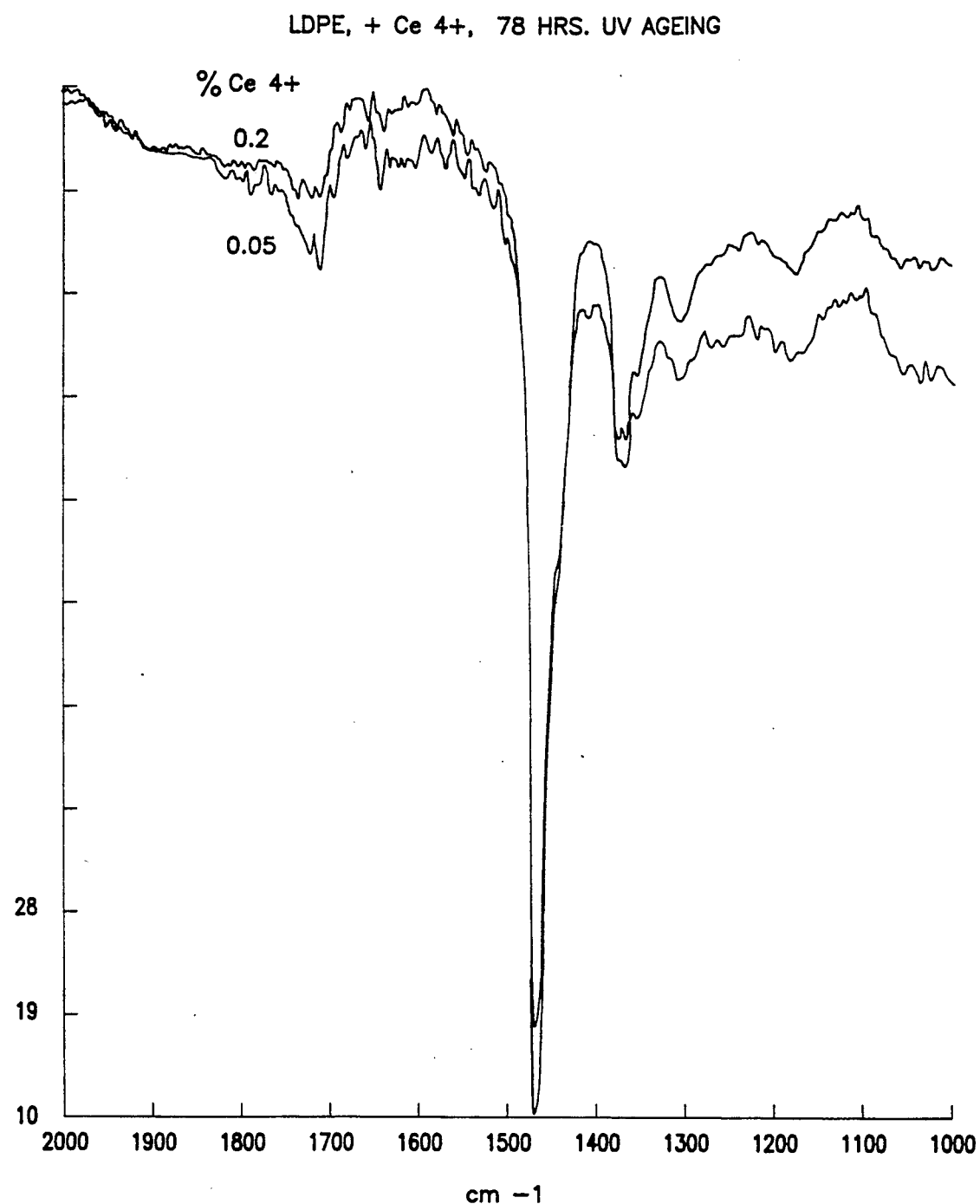
FIG. 8 represents the effect of cerium +4 stearate concentration on the degradation of polyethylene exposed to ultraviolet radiation.
Figure 9:
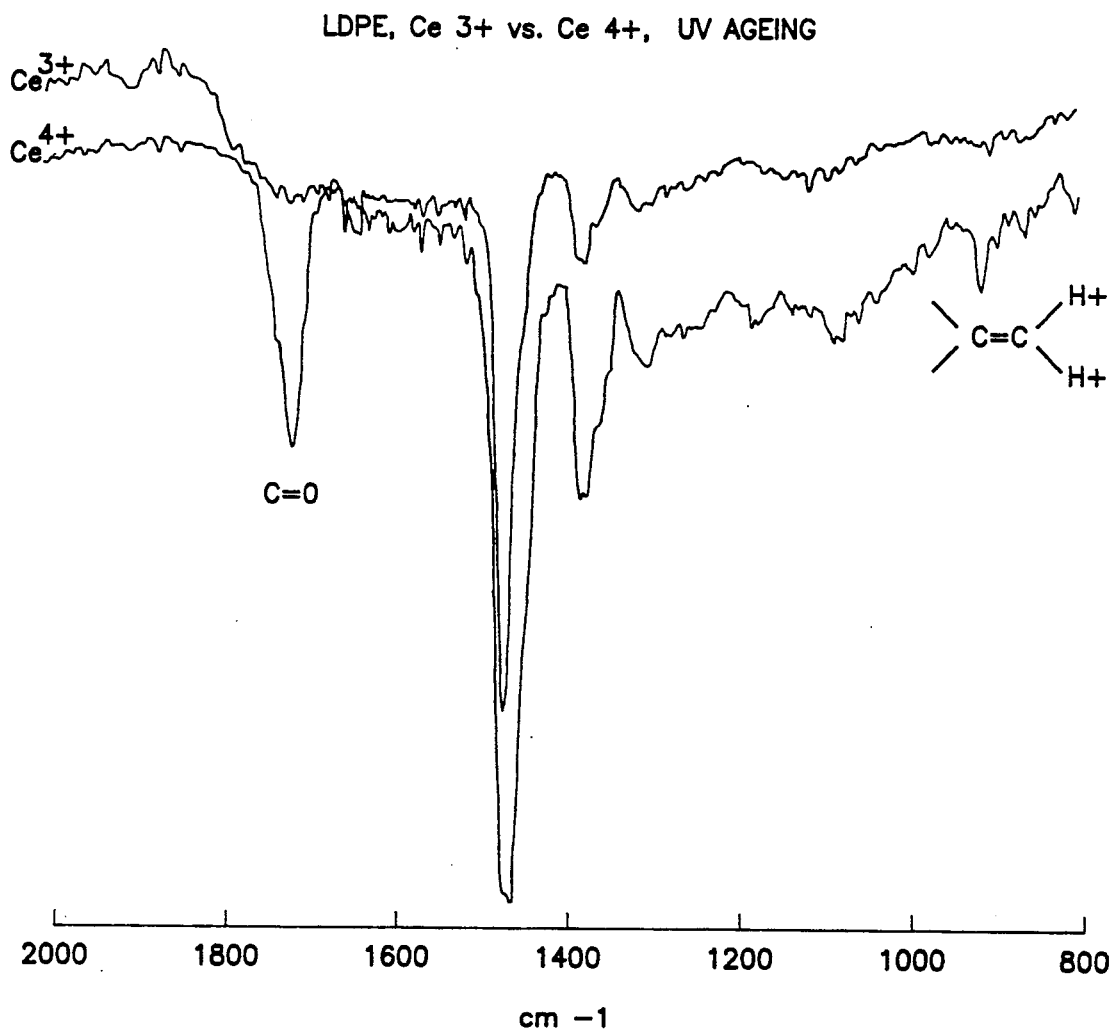
FIG. 9 represents the difference between an ultraviolet radiation degradation between cerium +3 stearate- and cerium +4 stearate-containing polyethylene composition.
Figure 10:
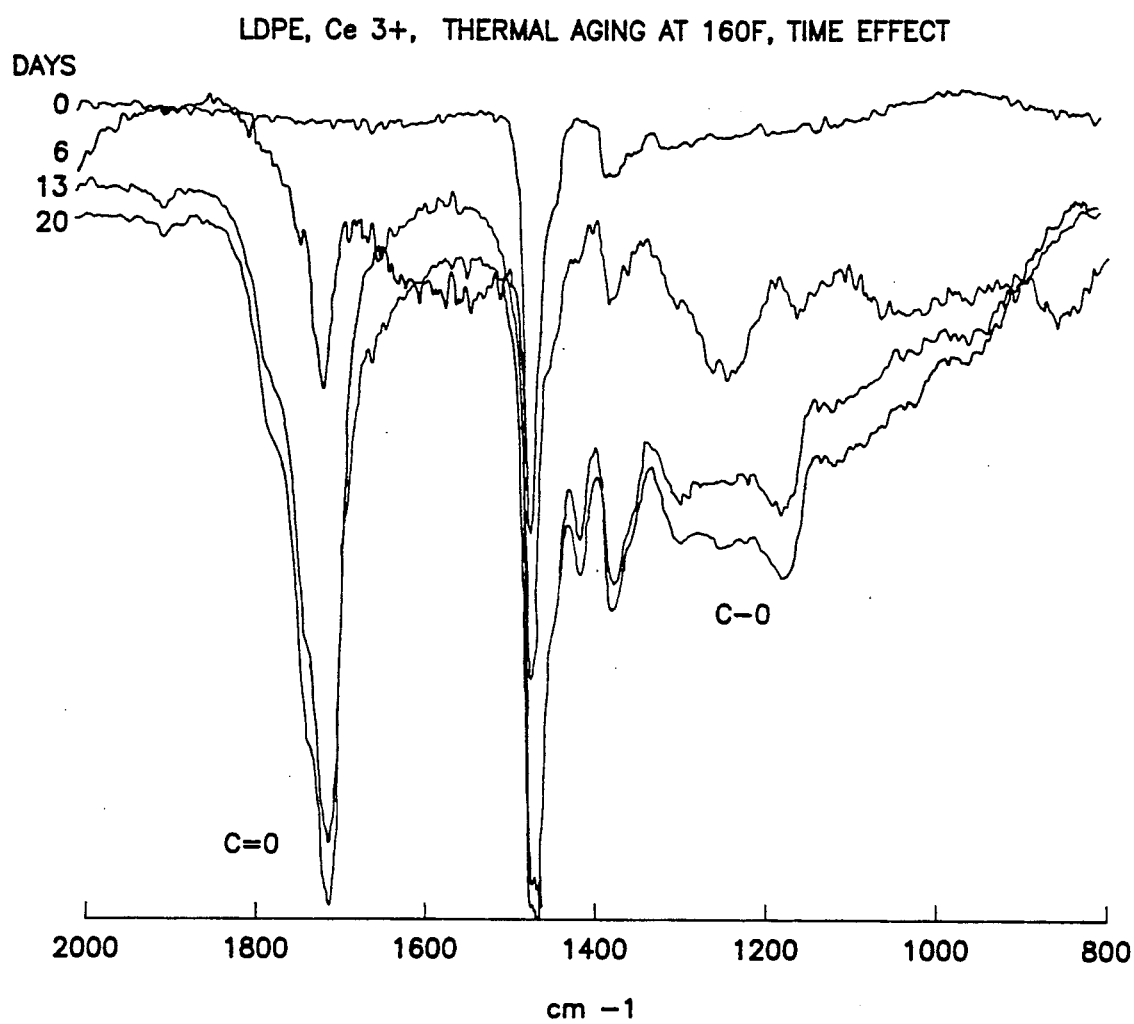
FIG. 10 is an overlayed spectra of polyethylene containing 0.2% cerium +3 stearate exposed to a temperature of 160 degrees F. for various time periods.
Figure 11:
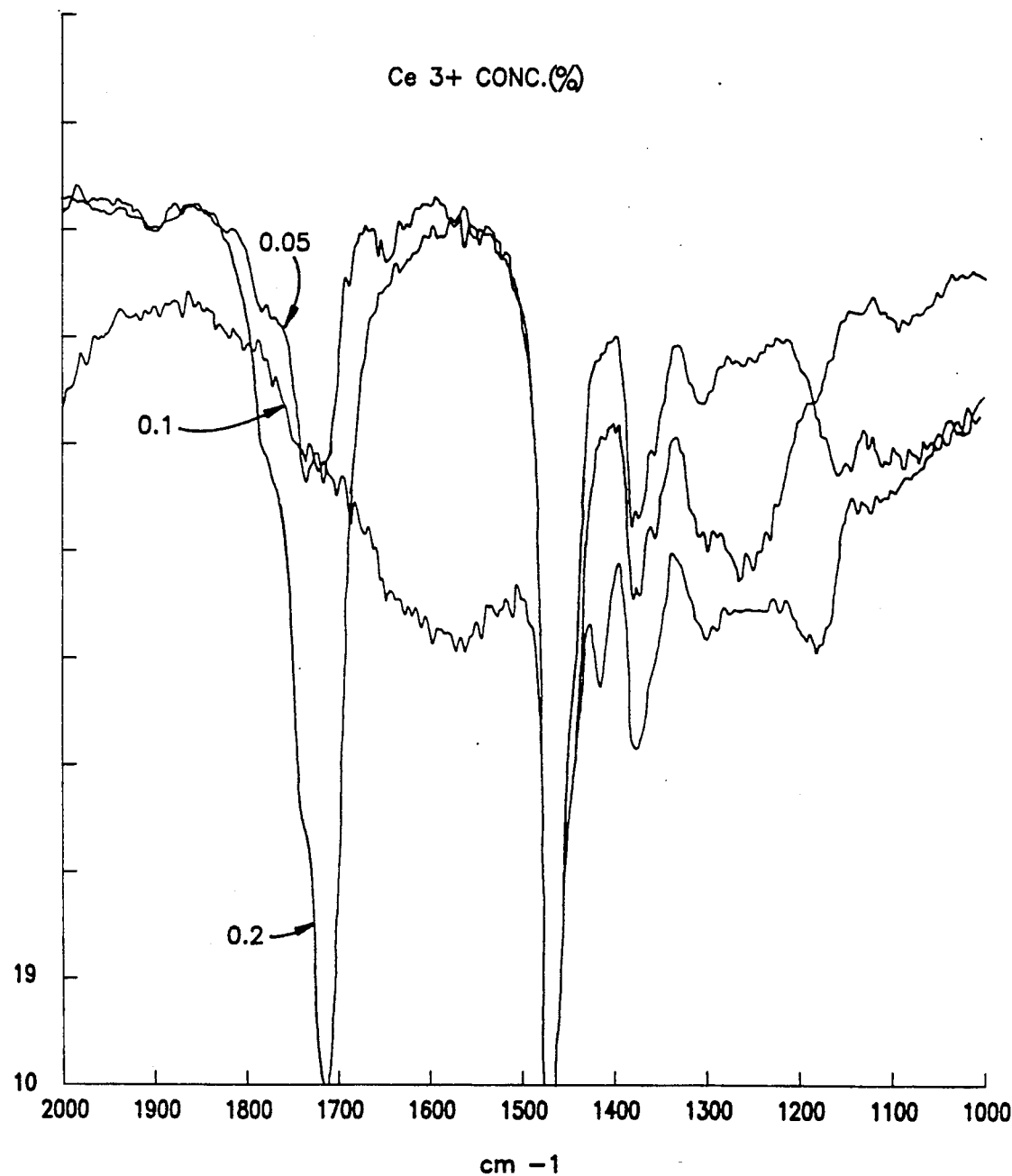
FIG. 11 represents the effect of cerium +3 stearate concentration on the thermal degradation of polyethylene.
Figure 12:
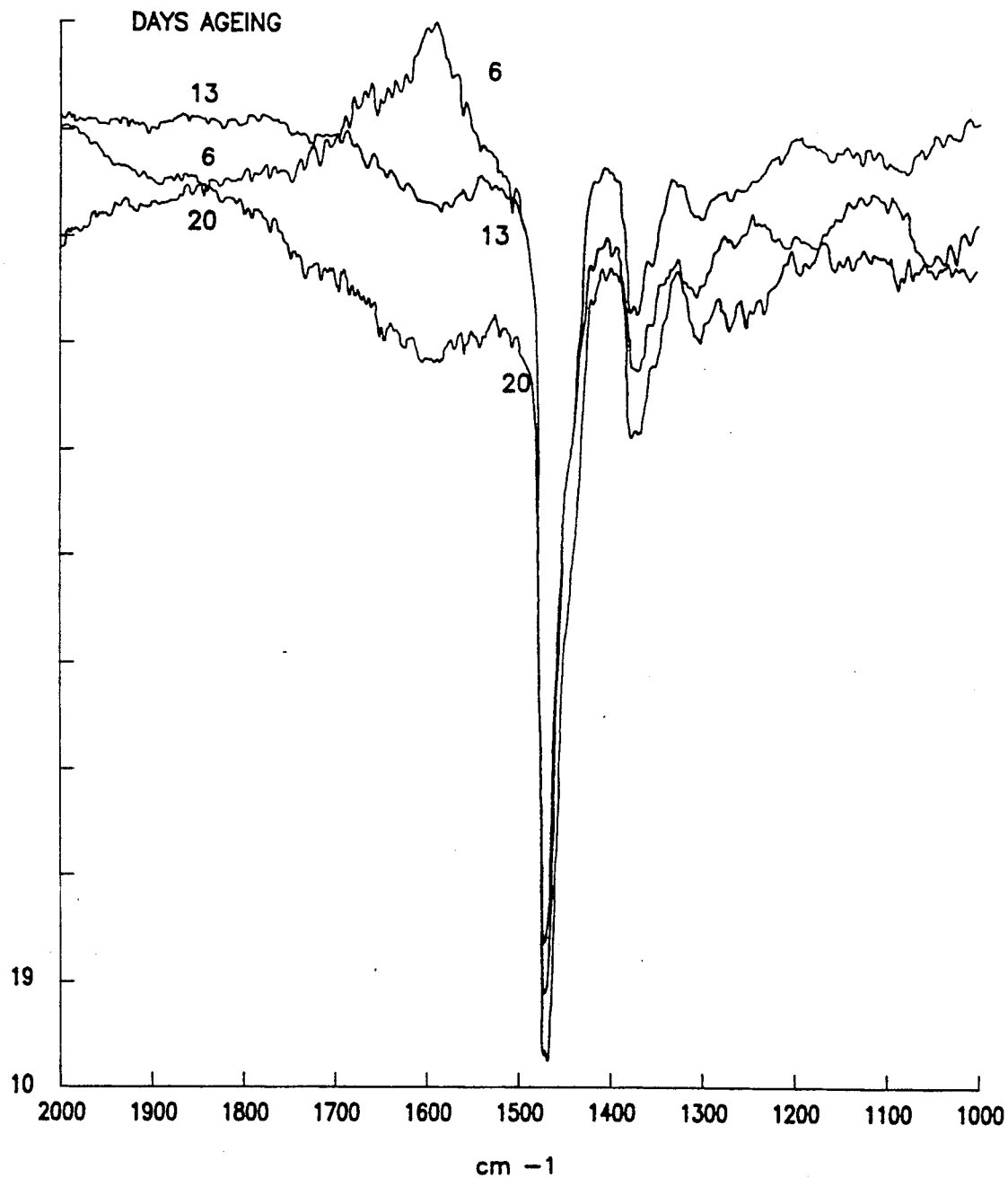
FIG. 12 is an overlayed spectra of polyethylene containing 0.2% cerium +4 stearate exposed to a temperature of 160 degrees F. for various time periods.
Figure 13:
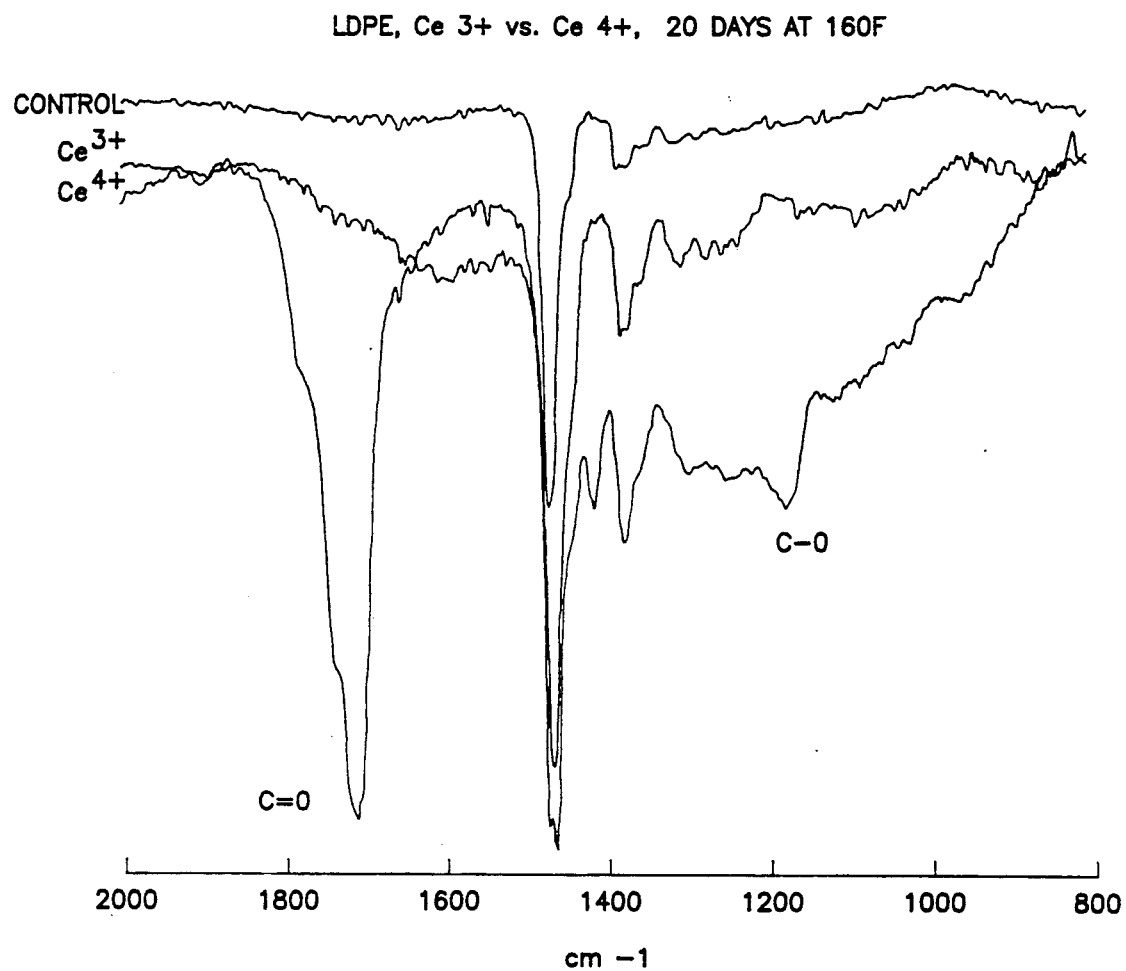
FIG. 13 is an overlayed spectra of the effect of cerium +3 stearate and cerium +4 stearate on the thermal degradation of polyethylene.

Infrared spectroscopic analysis of chemical structural changes proceeded with the same test specimens sampled for molecular weight changes. FIG. 5 displays the overlayed spectra of LDPE +0.2% Ce3+ stearate exposed to UV radiation for various lengths of time. Quite evident from the figure is the increasing intensity or concentration of carbonyl and C-O bands. Vinyl unsaturation at 909 cm$^{-1}$ also increases with exposure time, indicating condensation. For a given exposure time the intensity of the C=O, C-O and C=CH$_2$ increases with increasing Ce3+ concentration as might be expected (FIG. 6). Similar observation and trends were made with Ce4+ stearate as shown in FIGS. 7 and 8. The difference in UV degradation rate between Ce3+ and Ce4+ stearate containing formulations is illustrated in FIG. 9. For a given exposure time (39 hrs.) the 0.2% Ce3+ formulation shows significant c=o and vinyl unsaturation whereas the 0.2% Ce4+ formulation shows none within the detection limit of the spectrometer. Although the Ce concentration is 25% less in Ce4+ formulations, this fact does not significantly impact the observations as even the 0.05% Ce3+ formulation showed greater carbonyl and vinyl concentrations at the 39 hr exposure interval than the 0.2% Ce4+ formulation. Chemical structural change occurring within thermally aged samples was also monitored by infrared spectroscopy. As shown in FIG. 10, high concentrations of carbonyl and C-O appear within the 20 day monitoring period for the 0.2% Ce3+ formulation. Note, however, the absence of any vinyl unsaturation suggesting an alternative degradation mechanism to that of UV induced degradation. The effect of concentration of the Ce3+ stearate on the intensity of the carbonyl an C-O bands is shown in FIG. 11 for a given thermal aging time. Note, however, that as discussed previously, the 0.1% Ce3+ formulation is inactive. Ce4+ stearate formulations failed to show any thermally induced structural changes, as depicted in FIG. 12. For the 20 day thermal exposure time interval, the spectra of the control LDPE, the 0.2% Ce3+ and 0.2% Ce4+ formulations are overlayed in FIG. 13. After 24 days at 160 degrees F., these samples were analyzed for C, H and O yielding the following results:

| Formulation | C | H | O |
| --- | --- | --- | --- |
| Control | 86.0% | 14.5% | <100 ppm |
| Formulation 1-1 | 81.6 | 13.4 | 5.0% |
| Formulation 1-3 | 85.7 | 14.4 | 210 ppm |

Noting the 5.0% oxygen in the Ce3+ formulation, this data is not only in good qualitative agreement with the infrared spectroscopic data but it clearly illustrates the strong catalytic effect of Ce3+ in oxidizing LDPE.

Figure 14:
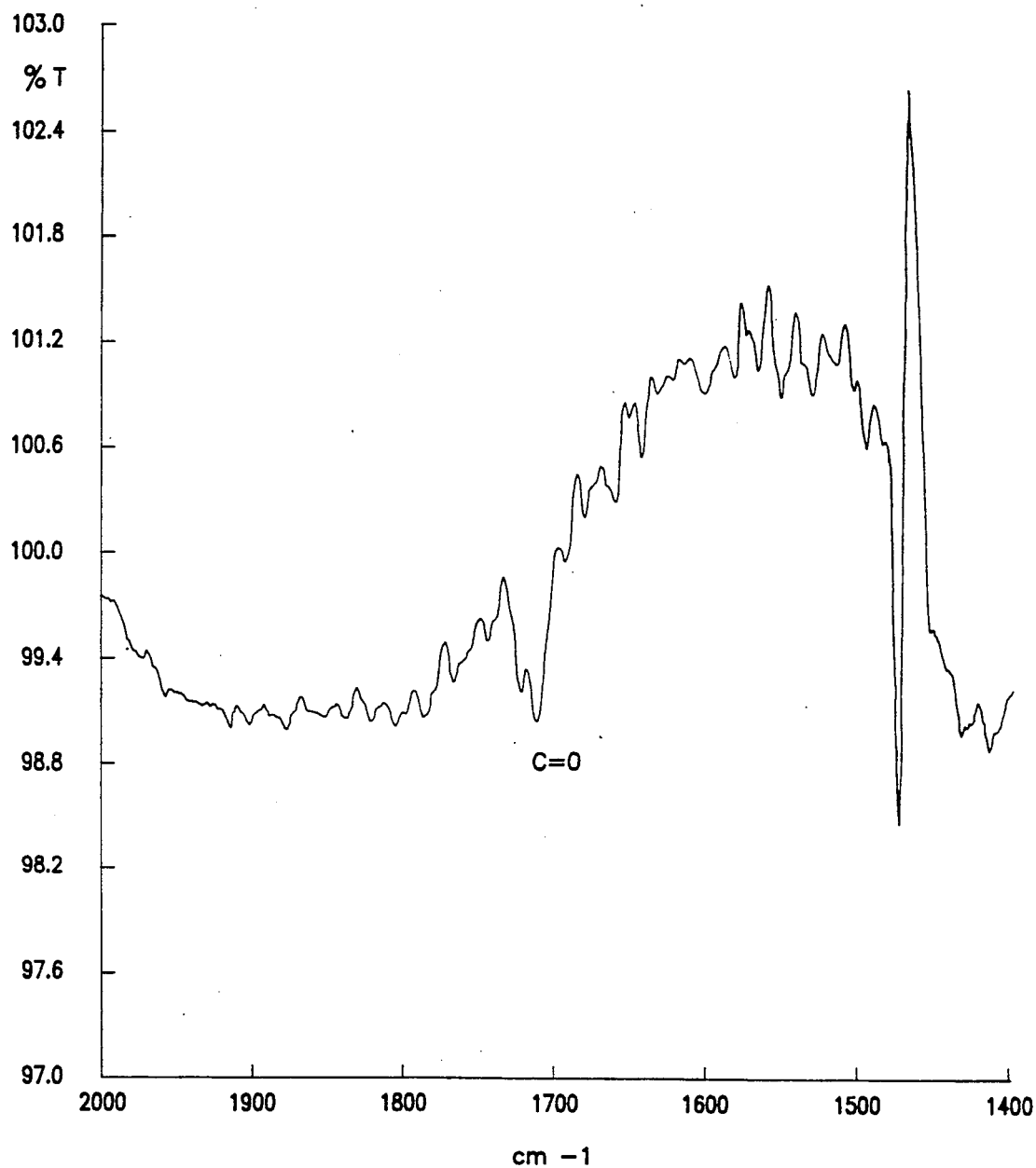
FIG. 14 represents the degradation of the polyethylene of a polyethylene composition containing 0.2% cerium +3 stearate during a storage period of 9 months at 72 degrees F.
Figure 15:
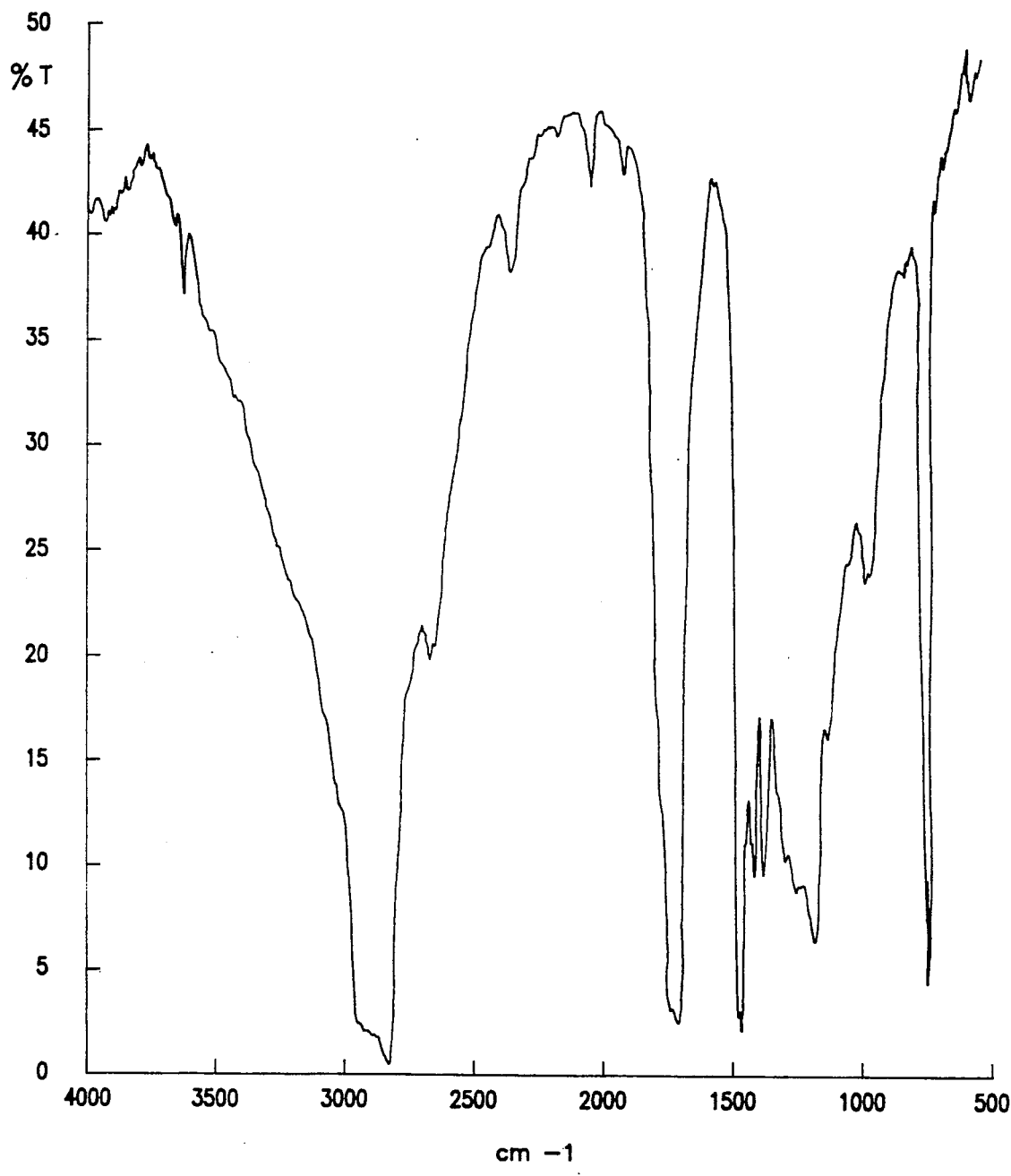
FIG. 15 represents the degradation of the polyethylene of polyethylene composition containing 0.2% cerium +3 stearate during a storage period of 8 months at 160 degrees F.

A duplicate set of pressed plaques were stored in a dark laboratory cabinet at 72 degrees F. for a long term monitoring of molecular weight and chemical structural changes. The 0.2% Ce3+ in LDPE was chosen for shelf-life monitoring as it showed the fastest rate of degradation in the accelerated testing. With this formulation, the molecular weight (Mw) decreased by 15% after 9 months, thus exhibiting good shelf stability. The infrared spectrum in FIG. 14 of the shelf-life specimen shows only a trace of carbonyl in comparison to the control LDPE plaque. In contrast to the spectrum obtained for the sample stored at 72 degrees F. for 9 months, the test specimen of the same formulation thermally aged for 8 months at 160 degrees F. gave the spectrum in FIG. 15. Note the large concentration of carbonyl in the 1700 cm−1 region. The broad, slowly sloping absorption between 3500 and 3000 cm−1 is indicative of carboxylic acid hydroxyl group(s).

In summary, the data demonstrate that cerium (III) stearate was effective in promoting both photo- and thermo-oxidation of LDPE, with effectiveness increasing with concentration. Cerium (IV) stearate was less effective than Ce(III) stearate in promoting photo-oxidation but did show catalytic activity in comparison with the control LDPE resin plaque. Under thermal stress conditions (160° F.), Ce4+ was ineffective. High temperature size exclusion chromatography was employed to quantitate molecular weight loss during the photo- and thermo- oxidation of LDPE. Within 30 hours of UV exposure at 313nm, the 0.2% Ce3+ stearate in LDpE formulation degraded to 50% of its original molecular weight (Mw). After 80 hrs. exposure the sample had degraded to 15% of its original Mw. Additionally, the thermally aged (160 degrees F.) plaque of this formulation lost 95% of its original Mw within 6 days. Infrared spectroscopic analysis of the plaques illustrated that photochemical and thermal degradation was accompanied by incorporation of oxygen in the polymer in the form of various carbonyl (C=O) and C-O groups. Vinyl (R2=CH2) groups were present in the photodegraded sample.

EXAMPLE 2

Ethylene-octene copolymer, known as linear-low density polyethylene (density=0.92, melt index=2-.0-2.6) composed of 91% ethylene and 9% 1-octaene and cerium (3+) stearate as an environmental degradation enhancer in amounts of 0% (control) and 0.2% of cerium salt as a dry powder were melt blended in a Brabender mixer using the same weights and conditions as in sample No. 1-1 and 1-3 in Example 1. Test sample preparation, stress testing and sample analysis were the same as in Example 1 also. The rate of molecular weight loss was monitored by high temperature size exclusion chromatography at selected time intervals. The peak average molecular weights (Mp) are tabulated in Tables 3 and 4 for the two different stress tests. As seen from the data the 0.2% cerium (3+) stearate formulation degrades at a faster rate than the control to a point where the chromatographic column can no longer distinguish or resolve their molecular weights because they are outside of the column's operating limits. Note also that for thermally aged samples (Table 3) there is an apparent induction time (between 120 and 240 hours of stressing) before molecular weight loss is observed. This is likely a result of the high concentration (0.1%, by weight) of Tetrakis (2,4-di-tertiary butyl phenyl) 4,4'-biphenylene disphosphonite antioxidant in the linear-low density polyethylene, resulting in an induction period for the cerium (3+) stearate to overcome (by oxidation) its effect.

TABLE 3

Thermal Oven (160° F.) Testing Molecular Weight Analysis

| Formulation | Peak Average Molecular Weight × 10e3 Sampling Time (Days) | | | | | |
| --- | --- | --- | --- | --- | --- | --- |
| | 0 | 1 | 5 | 10 | 26 | 40 |
| Control | 58 | 58 | 58 | 58 | 58 | 52 |
| 0.2% Ce Stearate | 58 | 53 | 58 | 14 | 7 | 5 |

TABLE 4

UV (313 nm)/ Condensation Testing Molecular Weight Analysis

| Formulation | Peak Average Molecular Weight × 10e3 Sampling Time (Hours UV Exposure) | | | | |
| --- | --- | --- | --- | --- | --- |
| | 0 | 12 | 72 | 120 | 228 |
| Control | 58 | 58 | 33 | 21 | 6 |
| 0.2% Ce Stearate | 58 | 58 | 25 | 12 | 6 |

It is, of course, understood that the above are merely preferred embodiments of the invention and various changes and alterations can be made without departing from the spirit and broader aspects thereof as set forth in the appended claims.

The embodiments of the invention in which an exclusive property or privilege is claimed are defined as follows:

1. An environmentally degradable polymer-based composition which degrades by any one of thermo-oxidation, photo-oxidation and the combination thereof, comprising a major portion by weight of at least one polyethylene, said polymer-based composition having incorporated therein from 0.05 to 0.50 weight percent of cerium +3 stearate, which promotes thermo-oxidation and photo-oxidation.

2. An environmentally degradable composition according to claim 1 wherein said polyethylene is selected from the group consisting of high density polyethylenes having a density of at least 0.94 grams per centimeter and a low density polyethylene having a density not greater than 0.94 grams per centimeter.

3. A composition in accordance with claim 2 wherein said high density polyethylene has a melt index of a range of from 0.05 to 100 decigrams per minute.

4. An environmentally degradable composition in accordance with claim 2 wherein said low density polyethylene has a melt index in the range from about 0.05 to about 100 decigrams per minute.

5. An environmentally degradable composition in accordance with claim 1 wherein said polyethylene comprises a copolymer of ethylene and at least one ethylenically unsaturated monomer which is copolymerizable with ethylene.

6. A method of accelerating thermo-oxidative, photo-oxidative and a combination of photo- and thermo-oxidative degradation of polyethylene under exposure to environmental conditions selected from the group consisting of air and ultraviolet light, air and darkness, air and elevated temperatures and combinations of such environmental conditions, which comprises adding to said polyethylene prior to exposure from about 0.05 to about 0.5 weight percent of cerium +3 stearate, based on the total weight of the resulting composition.

7. A method according to claim 6 wherein said polyethylene is selected from the group consisting of high density polyethylenes having a density of at least about 0.94 grams per centimeter and a low density polyethylene having a density not greater than about 0.94 grams per centimeter.

8. A method in accordance with claim 7 wherein said high density polyethylene has a melt index of a range of from about 0.05 to about 100 decigrams per minute.

9. A method in accordance with claim 7 wherein said low density polyethylene has a melt index in the range from about 0.05 to about 100 decigrams per minute.

10. A method in accordance with claim 6 wherein said polyethylene comprises a copolymer of ethylene and at least one ethylenically unsaturated monomer which is copolymerizable with ethylene, and wherein at least about 50% by weight of said copolymer comprises polyethylene units.

11. A method in accordance with claim 6 wherein said environmental conditions comprise air and ultraviolet light.

12. A method in accordance with claim 6 wherein said environmental conditions comprise air and darkness.

13. A method in accordance with claim 6 wherein said environmental conditions comprise air and elevated temperatures.

14. A method in accordance with claim 6 wherein said environmental conditions comprise darkness and elevated temperatures.

* * * * *